United States Patent
Wang et al.

(10) Patent No.: US 9,246,978 B2
(45) Date of Patent: Jan. 26, 2016

(54) METHOD FOR DETERMINING HIDDEN STATES OF SYSTEMS USING PRIVACY-PRESERVING DISTRIBUTED DATA ANALYTICS

(71) Applicant: Mitsubishi Electric Research Laboratories, Inc., Cambridge, MA (US)

(72) Inventors: Ye Wang, Andover, MA (US); Qian Xie, Tallahassee, FL (US); Shantanu Rane, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 246 days.

(21) Appl. No.: 14/076,307

(22) Filed: Nov. 11, 2013

(65) Prior Publication Data

US 2015/0134778 A1    May 14, 2015

(51) Int. Cl.
    G06F 15/16    (2006.01)
    H04L 29/08    (2006.01)
    G06F 21/62    (2013.01)
    G06K 9/62     (2006.01)
    G06F 17/30    (2006.01)

(52) U.S. Cl.
    CPC .......... *H04L 67/02* (2013.01); *G06F 17/30539* (2013.01); *G06F 21/6245* (2013.01); *G06K 9/6297* (2013.01)

(58) Field of Classification Search
    USPC ................. 709/219, 203, 200, 223; 707/736; 706/20, 45, 62; 704/256, 256.1, 273
    See application file for complete search history.

(56) References Cited

U.S. PATENT DOCUMENTS

| | | | | |
|---|---|---|---|---|
| 5,819,247 A * | 10/1998 | Freund | ................ | G06K 9/6256 706/25 |
| 7,739,581 B2 * | 6/2010 | Lee | ....................... | H04L 1/0041 714/758 |
| 8,351,497 B2 * | 1/2013 | Lee | ....................... | H04L 1/0071 375/240.01 |
| 2006/0073496 A1 * | 4/2006 | O'Toole | ............... | C12Q 1/6883 435/6.15 |
| 2008/0172233 A1 | 7/2008 | Smaragdis et al. | | |
| 2012/0143922 A1 | 6/2012 | Rane et al. | | |
| 2015/0204866 A1 * | 7/2015 | McAndrew | .......... | G01N 33/564 506/9 |

OTHER PUBLICATIONS

Huseyin Polat et al., "Private Predictions on Hidden Markov Models," Artificial Intelligence Review, Kluwer Academic Publishers, DO, vol. 34, No. 1, May 22, 2010, pp. 53-72, XPO19812204. sec 4.2.

* cited by examiner

*Primary Examiner* — El Hadji Sall
(74) *Attorney, Agent, or Firm* — Dirk Brinkman; Gene Vinokur

(57) ABSTRACT

A method classifies data to determine hidden states of a system, by first randomly permuting the data and inserting client to generate private data. A server classifies the private data according to a hidden Markov model (HMM) to obtain permuted noisy estimates of the states and the chaff, which are returned to the client. The client then removes the chaff, inverts the permuted noisy estimates to obtain unpermuted noisy estimates of the states.

5 Claims, 3 Drawing Sheets

METHOD FOR DETERMINING HIDDEN STATES OF SYSTEMS USING PRIVACY-PRESERVING DISTRIBUTED DATA ANALYTICS

FIELD OF THE INVENTION

This invention relates generally to data processing and information security, and more particularly to classifying private client data by a server under privacy constraints to determine hidden states of a system.

BACKGROUND OF THE INVENTION

The determination of underlying, unknown or hidden states of a system from noisy observations of the system is a fundamental classification problem relevant to various system diagnostics and data analytics applications.

A classification method that addresses this problem takes as input acquired data, and outputs estimates of the underlying states, or other relevant information regarding the states.

For example, a system may be in either a normal or broken state. In general, there can be many more than two relevant states, e.g., "failure in component X, Y or Z, etc.", and the system can switch between these states over time. These states cannot be directly observed. Instead, only noisy data, that are somehow related to the underlying states, can be acquired. Determining whether the system is operating normally or is broken is a matter of inferring the underlying state from the acquired data.

A model for the noisy data and the unknown temporally-evolving state can be a hidden Markov model (HMM). Parameters of the HMM include statistical distributions describing how the state evolves over time, and how the data are related to the underlying states. Given knowledge of these parameters, the Viterbi classification method outputs a most likely sequence of the underlying states that produced the acquired data. Lacking knowledge of the model parameters can make the design of the classification method significantly more difficult.

In a simple method, a client acquires the noisy data and has a classification method. However, when the client is resource constrained, a server can assists the client in estimating the underlying hidden states. The motivation for such a two-party coordination between the client and the server can be due to asymmetries of information or capabilities of the client and server, e.g., the server may have exclusive information about a system model, better classification methods, and better computational resources. In a case of information asymmetry, it may be that neither the client nor the server alone have full knowledge of the system parameters, and thus the coordination of the two parties may serve to jointly produce a better reconstruction than either could do alone.

Naturally, there may be privacy concerns for both the client and the server in participating in this coordination. The client desires to protect the privacy of the acquired data and the estimated states. The server desires to protect the privacy of its exclusive knowledge of the system parameters and its classifier.

SUMMARY OF THE INVENTION

The embodiments of the invention provide a method for classifying client data by a server when there are privacy concerns and possible information and capability asymmetries between the server and the client. The invention enables the server to assist the client to estimate the underlying hidden states of a system from acquired noisy data using a hidden Markov model.

The server does not need explicit knowledge of the state transition distribution. The server only needs to have either partial knowledge of the statistical distribution of the data given each possible state, or a trained classifier that estimates the hidden states. The client does not need knowledge of the data distribution under each state. The client only needs to have partial knowledge of the state transition distribution.

This method provides a reasonable degree of privacy to the client by partially concealing from the server the sequence of estimated states. The method also provides a reasonable degree of privacy to the server by concealing details of the server's knowledge of the data distributions and classification parameters from the client.

DETAILED DESCRIPTION OF THE PREFERRED EMBODIMENTS

System Overview

Figure 1:
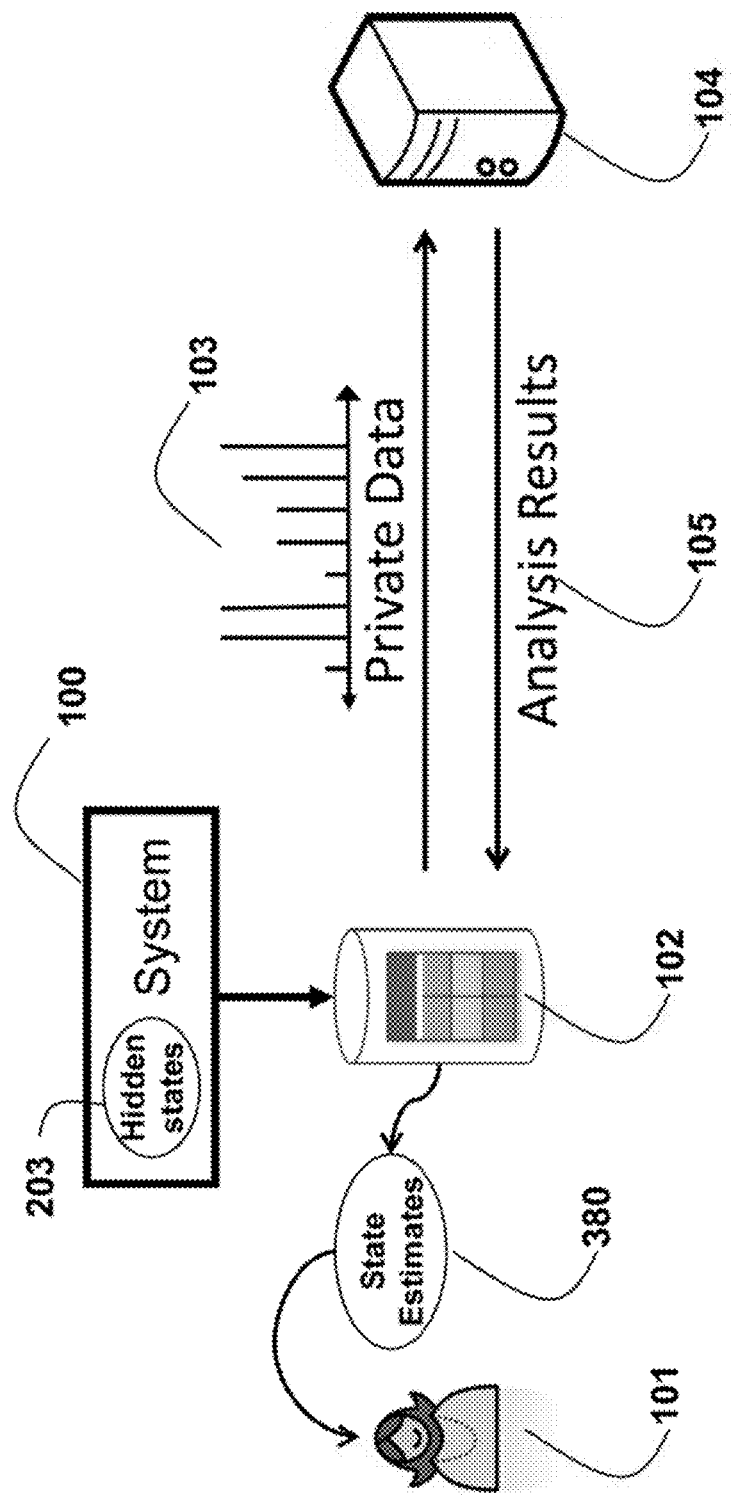
FIG. 1 is a schematic of a method for classifying private private client data by server according to embodiments of the invention.

As shown in FIG. 1, the embodiments of our invention provide a method for classifying private client data 105 by a server 104 to estimate hidden states 203 of a system 100. A user 101 of a client 102 desires to the classify private data 103. The client transmits the private data to the server. The server returns analysis result 105 to the client. The client can then post-process the results to obtain the classification of the private data, i.e., the estimates of the hidden states 380.

Figure 2:
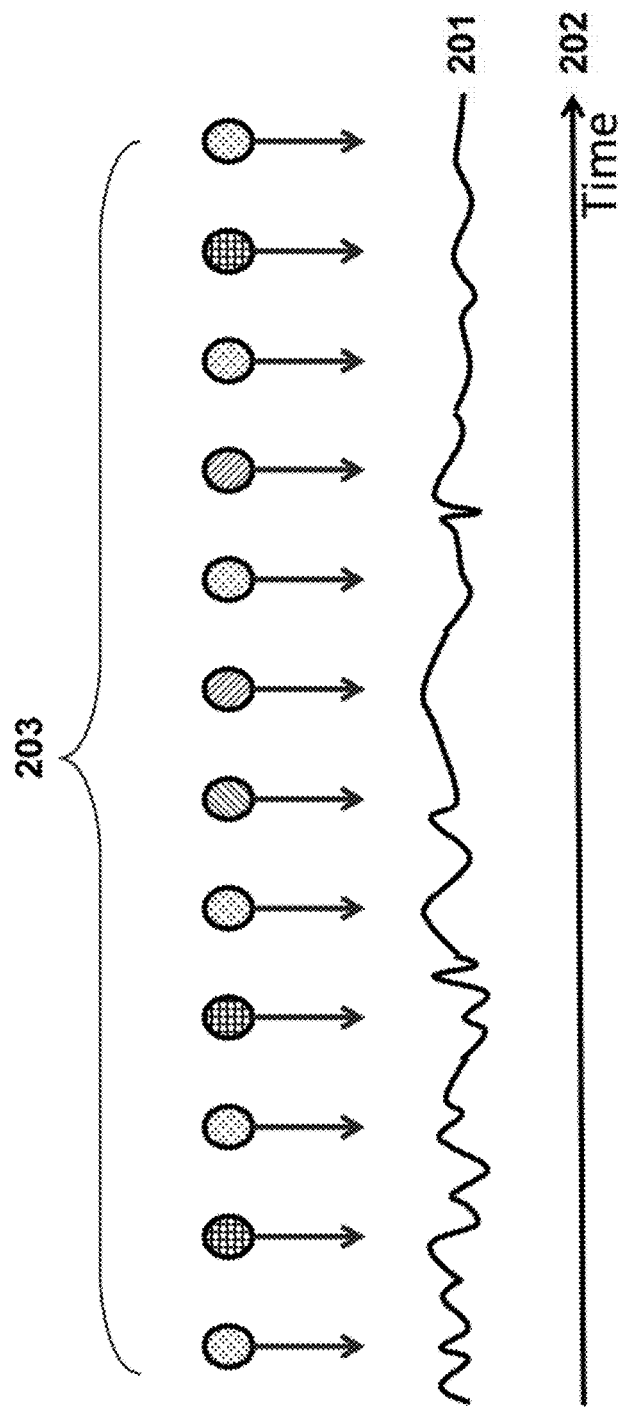
FIG. 2 is a schematic of a hidden Markov model process according to embodiments of the invention.

As shown in FIG. 2, the classification uses a hidden Markov model (HHM). The model is used to process noisy data 201 acquired over time 202 to estimate hidden states 203. Parameters of the HMM include distributions of state transition statistics and observation statistics.

Figure 3:
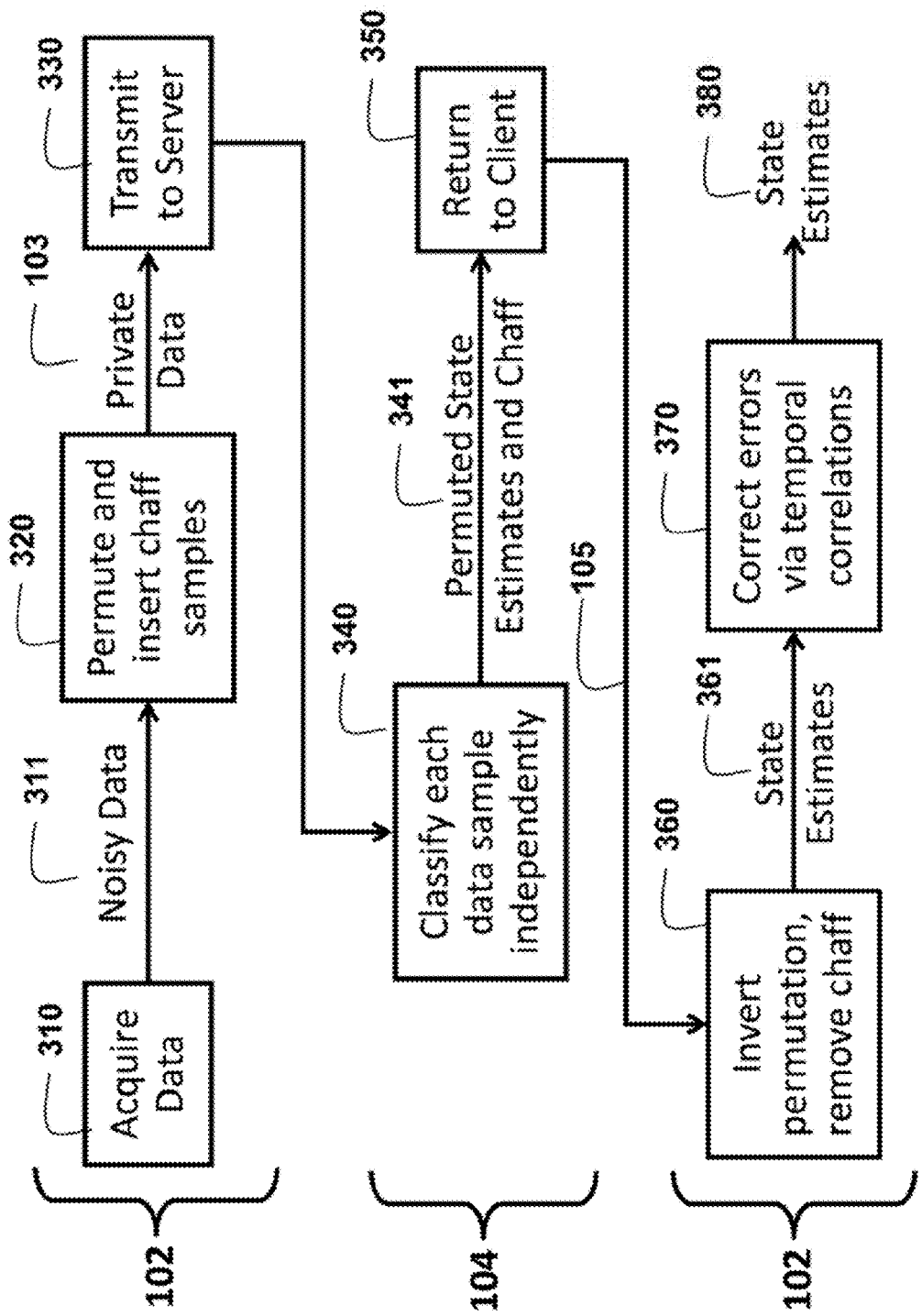
FIG. 3 is a flow diagram of a system and method for determining hidden states of noisy data according to embodiments of the invention.

FIG. 3 shows the details of the method and system shown in FIG. 1. The client 102 acquires 310 noisy data 311. The data are randomly permuted to generate permuted data, and chaff e.g., random data, is inserted 320 in the permuted data to generate the private data 103, which are transmitted 330 to the server 104. The server classifies 340 each sample of the data independently. The server returns 350 permuted state estimates and the chaff 341 to the client.

The client inverts 360 the permutation and removes the chaff to obtain unpermuted noisy state estimates 361. Errors in the noise estimates are corrected. 370 via temporal correlations to obtain the state estimates 380.

The client data are generated according to an HMM process, and the user wants to recover the underlying states of the HMM. The server has information and computational capabilities to perform classification to assist the client in recovering the states 380. In order to preserve privacy for both parties, the client and the server coordinate in the following manner.

The client alters the data before sending the acquired data to the server to preserve privacy as follows. An ordering of the data is randomly permuted. Artificial random data, known only to the client, are randomly inserted in the permuted data as chaff.

The server applies the classifier to the received private data. The classifier acts on each data point independently, producing a most likely underlying state that generated the data point.

The client post-processes the returned results to remove the permutation and chaff and can apply any knowledge of the temporal state correlations to improve the performance of the reconstruction. For example, the results corresponding to chaff are removed and the ordering is restored by reversing the permutation. Using knowledge of the correlations of the state, the client applies temporal correlations to smooths out errors in the result.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for classifying data to determine hidden states of a system, comprising:
   randomly permuting the data, acquired from the system by a client, to generate permuted data;
   inserting, by the client, chaff in the permuted data to generate private data;
   transmitting, by the client to the server, the private data;
   classifying, by the server, each sample of the private data independently according, to a hidden Markov model (HMM) to obtain permuted noisy estimates of the states and the chaff;
   returning, by the server to the client, the permuted noisy estimates of the states and the chaff;
   removing, by the client, the chaff;
   inverting, by the client after removing the chaff, the permuted noisy estimates to obtain unpermuted noisy estimates of the states; and
   correcting errors, by the client, to obtain estimates of the hidden states.

2. The method of claim 1, wherein server has either partial knowledge of a statistical distribution of the private data given each possible state or a trained classifier that estimates the states, and the client has partial knowledge of a state transition distribution.

3. The method of claim 1, wherein parameters of the HMM include distributions of state transition statistics and statistics of the private data.

4. The method of claim 1, wherein the chaff is random data.

5. The method of claim 1, wherein the correcting uses temporal correlations to obtain the estimates of the hidden states.

* * * * *